United States Patent [19]

Latter

[11] Patent Number: 4,492,017

[45] Date of Patent: Jan. 8, 1985

[54] METHOD OF ASSEMBLING A RIGID WIRE FOR DRIVEN ROTATIONAL MOVEMENT

[75] Inventor: Bruce B. Latter, Anchorage, Ky.

[73] Assignee: General Electric Company, Louisville, Ky.

[21] Appl. No.: 388,808

[22] Filed: Jun. 16, 1982

[51] Int. Cl.³ .............................................. B23P 11/00
[52] U.S. Cl. ........................................ 29/434; 29/453; 62/137; 62/344; 220/95; 220/96
[58] Field of Search .......................... 62/135, 137, 344; 220/95, 96; 29/453, 434

[56] References Cited

U.S. PATENT DOCUMENTS

| | | | |
|---|---|---|---|
| 1,126,658 | 1/1915 | Roughton | 220/96 |
| 1,512,163 | 10/1921 | Duckett | 220/96 |
| 1,552,339 | 9/1925 | Nicchia | 220/96 X |
| 1,611,567 | 12/1926 | Sonen | 29/434 X |
| 1,791,180 | 2/1931 | Wendle | 220/96 |
| 1,976,765 | 10/1934 | Berry | 220/96 X |
| 2,414,708 | 1/1947 | Bassichia | 220/96 X |
| 2,501,572 | 3/1950 | Marquez | 220/96 X |
| 2,770,102 | 11/1956 | Roedter | 62/7 |
| 2,785,826 | 3/1957 | Mappes | 220/96 |
| 2,839,220 | 6/1958 | Carlin | 220/96 X |
| 2,858,641 | 11/1958 | Trimble | 220/96 X |
| 2,970,453 | 2/1961 | Harle et al. | 62/344 |
| 2,994,206 | 8/1961 | Shaw et al. | 62/137 |
| 3,034,312 | 5/1962 | Harle | 62/137 |
| 3,041,844 | 2/1962 | Shaw | 62/135 |
| 3,047,073 | 7/1962 | Fry | 29/453 |
| 3,163,017 | 12/1964 | Baker et al. | 62/137 |
| 3,163,018 | 12/1964 | Shaw | 62/137 |
| 3,175,282 | 3/1965 | Meeker et al. | 29/453 X |
| 3,341,047 | 9/1967 | Nauta | 220/96 |
| 3,358,877 | 12/1967 | Eckhoff | 29/453 X |
| 3,398,553 | 8/1968 | Latter et al. | 62/353 |
| 3,486,684 | 12/1969 | Dills et al. | 220/95 X |
| 3,545,217 | 12/1970 | Linstromberg | 62/137 |
| 3,557,854 | 1/1971 | Reitzel | 29/434 X |
| 3,765,329 | 10/1973 | Kirkpatrick et al. | 29/453 X |
| 3,807,675 | 4/1974 | Seckerson | 29/453 X |
| 3,863,461 | 2/1975 | Bright | 62/137 |
| 3,926,007 | 12/1975 | Braden | 62/137 |
| 4,012,812 | 3/1977 | Black | 24/90 B |
| 4,071,939 | 2/1978 | Bock | 29/453 X |
| 4,163,372 | 8/1979 | Frye | 62/259 |
| 4,205,411 | 6/1980 | Cupp et al. | 220/96 X |
| 4,355,597 | 10/1982 | Blasbalg | 220/95 X |
| 4,365,725 | 12/1982 | Pfeifer | 220/96 |

Primary Examiner—Charlie T. Moon
Assistant Examiner—Ronald S. Wallace
Attorney, Agent, or Firm—Frederick P. Weidner; Radford M. Reams

[57] ABSTRACT

A method of assembling a rigid wire element for driven rotational movement including attaching a rotational element to a drive means with the rotational element having a transverse bore therethrough slightly larger in diameter than the rigid wire element diameter. A pivot element is located spaced from the rotational element and has an aperture slightly larger in diameter than the rigid wire element diameter. The rigid wire is formed having at one end thereof a relatively straight portion having at one end an integrally formed stop element and at the opposite end a terminal end portion formed at an acute angle relative to the straight portion. The opposite end of the rigid wire element has a U-shaped portion having two legs interconnected by a center section. The three elements are assembled by inserting the terminal end portion of the rigid wire element through the rotational element transverse bore then rotating the rigid wire element to orient the straight portion parallel to the bore in the rotational element and inserting the center section of the U-shaped portion of the rigid wire element at the opposite end into the aperture of the pivot element. By this arrangement and method of assembly there is no need for additional fastening means such as set screws and the like and it is easy to make a secure assembly of the rigid wire element for driven rotational movement.

5 Claims, 11 Drawing Figures

METHOD OF ASSEMBLING A RIGID WIRE FOR DRIVEN ROTATIONAL MOVEMENT

BACKGROUND OF THE INVENTION

The present invention relates to a method of assembling a rigid wire element for driven rotational movement and particularly a method of assembling a driven rotatable feeler arm in an icemaker of a household refrigerator which is utilized to detect if the icemaker should continue to make ice pieces.

For purposes of describing the present invention and its utility, reference will be made to an automatic icemaker for use in household refrigerators, the icemaker being of the type shown and described in U.S. Pat. Nos. 3,163,017—Baker et al and 3,163,018—Shaw, issued Dec. 29, 1964. The icemaker comprises a mold including at least one ice cavity in which an ice piece is formed, ejecting means including a pad normally positioned in the lower portion of the cavity and movable to a position above the top of the cavity for ejecting an ice piece from the cavity and a pivoted sweep or rake element actuable after the ice piece has been raised to its upper position for movement across the top of the mold cavity to remove the ice piece from the pad. The sweep means disclosed in the aforementioned patents moves about a pivot axis above the cavity from a normal position to one side of the cavity through an arcuate path to a point above the cavity. The sweep is so designed that the ice engaging portion thereof clears the pad in its upper position. During the sweep's movement through the arcuate path, the ice pieces are engaged by the sweep and are moved from the pad and the mold into an underlying ice piece receptacle. At the end of the ice piece removal operation, the sweep is returned by mechanical linkage to its position rearward of the mold and the ice piece forming cycle is again initiated. When, however, the underlying receptacle is full of ice pieces it is desirable to stop the operation of the icemaker and for this purpose such icemakers employ rigid wire elements or feeler arms that are moved downwardly toward the ice piece receptacle and by mechanical and switch means if there are sufficient ice pieces in the receptacle to stop the feeler arm's downward movement the icemaker timing mechanism is stopped. When sufficient ice pieces have been removed from the receptacle the feeler arm can continue its downward movement and in so doing the icemaker is actuated to again start making and harvesting ice pieces.

It is desirable that the feeler arm be drivingly rotated upwardly during the ice piece harvesting operation so that it does not interfere with the ice pieces being swept from the mold and down into the receptacle.

It is also desirable for ease of assembly that the feeler arm be the last component to be assembled in the icemaker and heretofore to accomplish this there was needed a set screw with attendant manipulation on the part of the assembler to secure the feeler arm for driven rotational movement. Set screws can back off after a period of time which results in the feeler arm becoming disconnected.

By this invention there is provided a rigid wire element or feeler arm arrangement and method of assembly that allows the feeler arm to be the last assembled component of the icemaker and it may be assembled without additional fastening means along with ease and security of assembly for driven rotational movement thereof.

SUMMARY OF THE INVENTION

A method of assembling a rigid wire element for driven rotational movement, for example, but not limited to a feeler arm of an automatic icemaker including attaching a rotational element to a drive means which rotational element has a transverse bore therethrough slightly larger in diameter than the rigid wire element diameter. A pivot element is located spaced from the rotational element, said pivot element having an aperture slightly larger in diameter than the rigid wire element diameter. The rigid wire element is formed having at one end thereof a relatively straight portion having at one end an integrally formed stop element and at the opposite end a terminal end portion formed at an acute angle relative to the straight portion. The opposite end of the rigid wire element is formed as a U-shaped portion having two legs interconnected by a center section. The three elements are assembled by inserting the terminal end portion of the said one end of the rigid wire element through the rotational element transverse bore then rotating the rigid wire element to orient the straight portion parallel to the bore in the rotational element and inserting the center section of the U-shaped portion of the rigid wire element at the opposite end into the aperture of the pivot element. In this manner of assembly there is no need for an additional fastener such as a set screw and the rigid wire element is easily and securely assembled for driven rotational movement thereof.

DESCRIPTION OF THE PREFERRED EMBODIMENT

Figure 1:
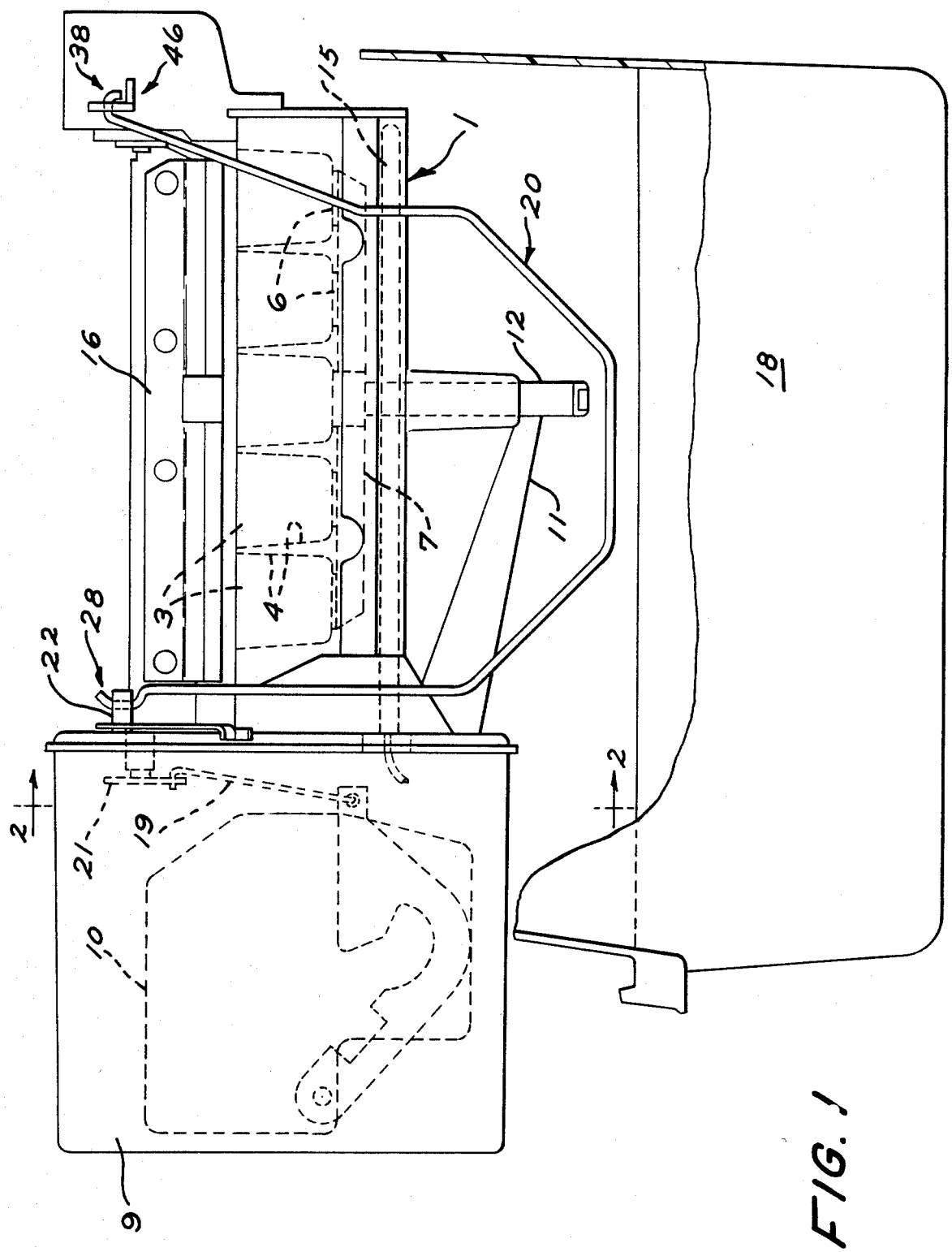
FIG. 1 is an elevational view of an icemaker embodying the present invention
Figure 2:
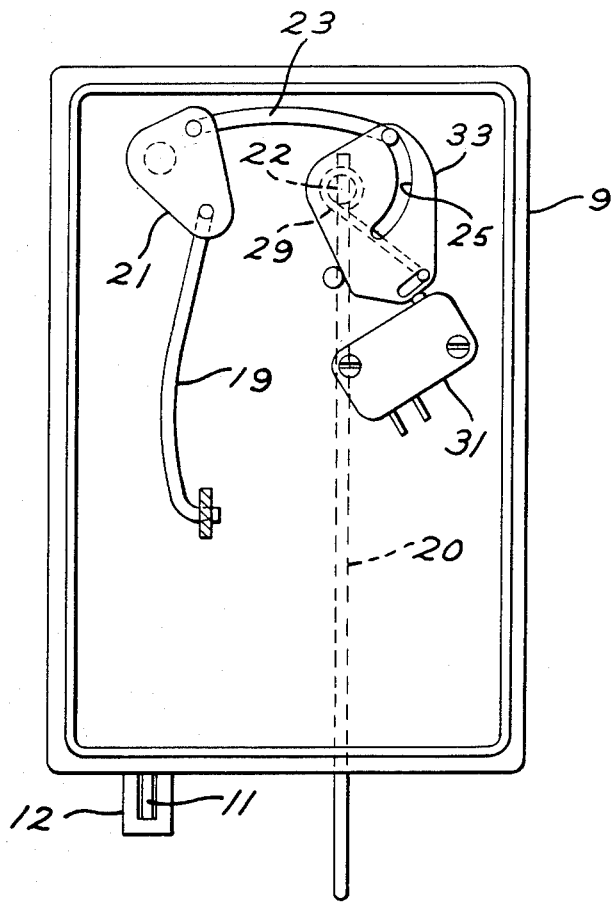
FIG. 2 is a view taken along lines 2—2 of FIG. 1.

The automatic icemaker illustrated in FIGS. 1 and 2 of the accompanying drawings comprises a mold 1 adapted to be secured in any suitable manner to a wall of the freezer compartment of a household refrigerator. The mold includes a plurality of generally cylindrical ice cavities 3 arranged in a straight line and separated from one another by walls 4, each of which includes a vertical passage (not shown) which provides means for the flow of water from one cavity to another during the mold filling operation. A plurality of pads or pistons 6 which to a substantial extent form the bottoms of the cavities 3 are interconnected by a bar 7 slidably received within the passages that allow the water to flow from one cavity to another.

Control means and most of the mechanical drive means for operating the icemaker is generally contained within a housing 9 secured to one end of the mold, this mechanical drive means including a motor 10 connected through drive means including a lever 11 and a rod 12 is designed to raise the pads 6 and the ice pieces carried thereby out of the cavities 3. The icemaker also includes an elongate rake or sweep 16 extending substantially the full length of the mold 1.

The sweep is pivotally supported on the mold structure above the upper surface of the mold 1 or more specifically above the cavities 3 so that during rotational movement thereof about its pivot axis, it will move from a position to one side of the mold cavity into engagement with the ice pieces supported on the pads 6 and then part way across the space above the cavities for the purpose of sweeping the ice pieces off of the pads and into the storage basket 18 positioned below the mold.

For a more detailed description of the construction and operation of the icemaker thus far described reference is made to the aforementioned patents to Baker et al and Shaw. As is more fully described therein, the automatic operating cycle of the icemaker comprises filling of the cavities 3 with water, freezing the water to make ice pieces, heating of the mold by a heater 15 that extends along the bottom of mold 1 to free the formed ice pieces from the cavities, ejection of the ice pieces by movement of the pads 6 from their lower position in the bottom of the cavities to a raised position slightly above the upper surface of the mold, pivotal movement of the sweep 16 from its rearward position across the top of the mold for engaging the ejected ice pieces and sweeping the ice pieces from the mold down into a receptacle 18 and return of the sweep to its rearward position and the pad 6 to its lower position followed by the introduction of another charge of water into the mold cavities to repeat the cycle.

In the sweeping movement of the sweep 16 to harvest the ice pieces, it is necessary to apply sufficient positive force to the ice pieces to break any of the pieces still frozen to the pad 6 loose for discharge into the receptacle 18. To assure this positive release of the ice pieces from the ejector pad, the sweep must be sufficiently rigid to break the ice pieces loose. In addition, the sweep must be positively driven in its outward arcuate movement so that upon engagement with the ice pieces it will break the ice pieces from the pads 6 by exerting considerable force thereon. This outward movement of the sweep is accomplished by a motor driven gear mechanism shown and described in the aforementioned patents to Shaw and Baker et al and includes a linkage bar 19 and a drive element 21.

To prevent the icemaker from continuing to make ice pieces when the receptacle 18 is full, a feeler arm 20 made of rigid wire is rotationally driven by a rotational element 22 linked to drive element 21 by a linkage bar 23 to raise the feeler arm 20 from its downward position as shown in FIGS. 1 and 2 to a raised position at the time that the sweep is driven outwardly so that when it engages the ice pieces and sweeps them from the mold into the underlying receptacle 18 the feeler arm 20 is raised up out of the way of the falling ice pieces. By the linkage arrangement including a switch cam 33 attached to the rotational element 22 and a linkage bar 23 between the rotational element 22 and the drive element 21 the motor driven gear mechanism not only rotates the sweep attached to the drive element 21 to harvest the ice pieces from the mold but also raises the feeler arm 20 up out of the way of the falling ice pieces. Upon completion of the ice piece harvest operation the mechanism ceases to influence the feeler arm 20 and by well known lost motion means including slot 25 the feeler arm is by bias means such as spring 29 caused to rotate back down into the receptacle 18 provided there are not enough ice pieces in the receptacle to block its downward movement. If its downward movement is blocked by ice pieces switch means including switch 31 shut off the icemaker so that the next cycle for harvesting ice pieces is prevented until sufficient ice pieces are removed to allow the feeler arm 20 to again resume its lower position. In assembling an icemaker as described above, it is desirable for ease of assembly to have the feeler arm 20 the last component to be assembled. Heretofore in order to accomplish that result, one end of the feeler arm 20 was attached to the rotational element 22 by a set screw. To eliminate the need for a set screw and still have the feeler arm the last icemaker component assembled and to improve the ease and security of assembly, the following method of assembling a rigid wire or feeler arm 20 for driven rotational movement has been devised.

Figure 4:
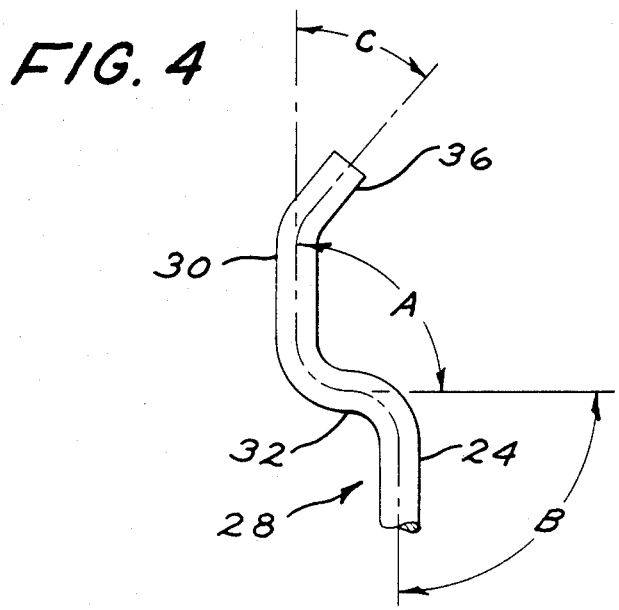
FIG. 4 is one end portion of the rigid wire element utilized in the present invention.
Figure 5:
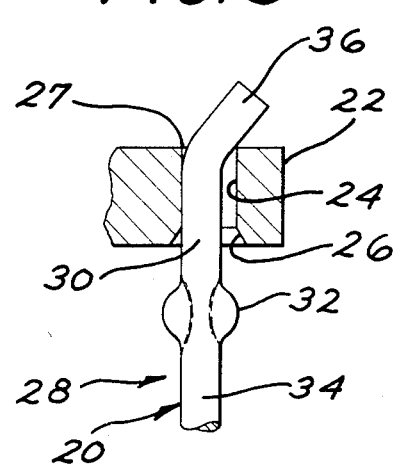
FIG. 5 is an alternate embodiment of the one end portion of the rigid wire element shown in FIG. 4.
Figure 3:
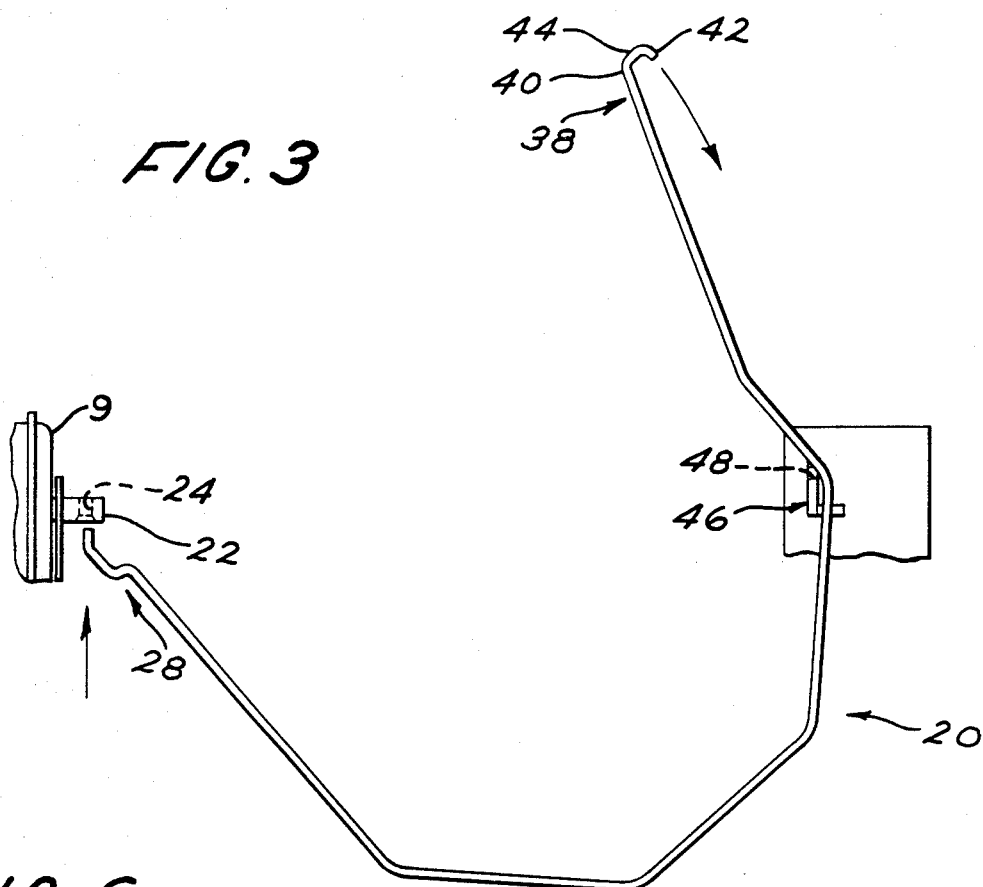
FIG. 3 is an elevational view showing the arrangement of the three elements to be assembled according to the present invention.

With reference to FIGS. 3-8 attachment of one end 28 of the feeler arm 20 will be described. Projecting through the housing 9 of the motor driven drive mechanism is a rotional element 22 which is rotated by a drive means associated with the motor driven drive mechanism as described above. The rotational element 22 has a transverse bore 24 which is cylindrically shaped and has a chamfered opening 26 at one end thereof. As particularly seen in FIG. 4, the one end 28 of feeler arm 20 is formed to have a relatively straight portion 30 having at one end an integrally formed stop element 32 which in the preferred embodiment is a portion of the rigid wire element formed at substantially a right angle (designated "A") to the straight portion 30 and a portion 34 joined at substantially a right angle (designated "B") to the right angle portion 32 such that the portion 34 is substantially parallel to the straight portion 30 as seen in FIG. 4 by the parallel longitudinal center lines. A terminal end portion 36 is formed at an acute angle (designated "C") relative to the straight portion 30. In the preferred embodiment the angle designated "C" in FIG. 4 is about 40°, however, any angle between 20° and 60° relative to the plane passing through the central axis of the straight portion 30 is satisfactory. FIG. 5 is an alternate embodiment of the one end 28 of the feeler arm 20 wherein the integrally formed stop element 32 is a portion of the rigid wire element or feeler arm that is deformed as by a punch press to give it a dimension greater than the transverse bore 24 of the rotational element 22.

The opposite or other end 38 of the feeler arm 20 has its terminal end formed as a U-shaped portion having a leg 40, a terminal end leg 42 and a center section 44 interconnecting the legs 40 and 42. The configuration of the feeler arm 20 between the one end 28 and the other end 38 will depend on the particular application involved. The opposite end 38 of the feeler arm 20 is rotationally or pivotally mounted in a pivot element 46 spaced from the rotational element 22. In the preferred embodiment the pivot element 46 is in axial alignment with the rotational element 22. The pivot element has an aperture 48 slightly larger in diameter than the wire diameter of the feeler arm 20.

Figure 6:
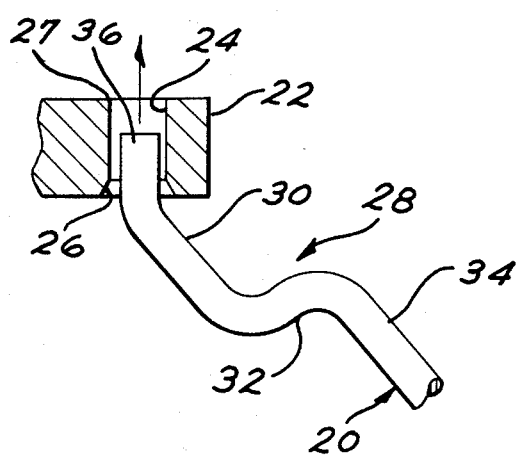
FIGS. 6–8 show the progressive steps of assembling the one end portion of the rigid wire element shown in FIG. 4 for driven rotational movement.
Figure 7:
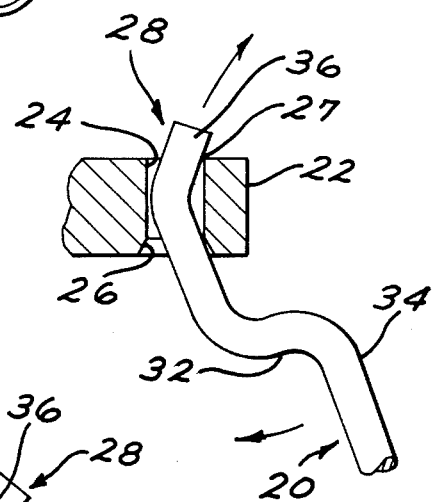
Figure 8:
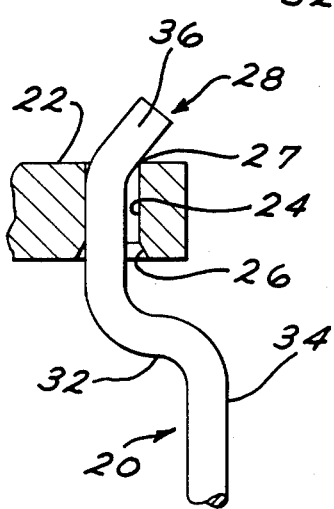

The three elements, namely the rotational element 22, the feeler arm 20 and the pivot element 46, are assembled by inserting the terminal end portion 36 of the one end 28 of the feeler arm 20 through the chamfered opening 26 of the bore 24 as shown in FIG. 6. After such insertion the rigid wire feeler arm 20 is rotated as shown in FIG. 7 until the straight portion 30 is parallel with the transverse bore 24 as shown in FIG. 8. It will be noted that by the configuration of the one end 28 that the feeler arm 20 cannot be withdrawn by simple downward or vertical movement because the terminal end portion 36 interferes with the peripheral edge 27 surrounding the transverse bore 24. The stop element 32 prevents the end 28 from moving upwardly through the bore 24.

Figure 9:
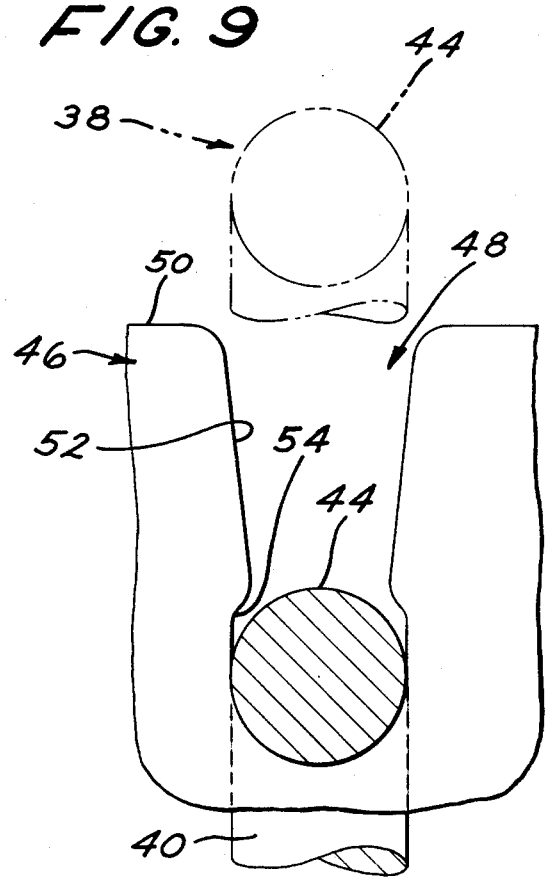
FIG. 9 shows the end of the rigid wire element opposite from those shown in FIGS. 6–8 ready for assembly shown in phantom and in full line in its assembled position.

The opposite end 38 of the feeler arm 20 is rotationally mounted in the pivot element 46 as shown in FIG. 9. The pivot element 46 in this embodiment has a body 50 which is flexible such as a body made of plastic material so that the center section 44 of the U-shaped terminal end can be inserted into the aperture 48 by forcibly moving it from the position shown in phantom line in FIG. 9 downwardly through the narrower tapered, resilient slot opening 52 into the bottom portion 54 of aperture 48 which acts as the pivot about which the center section 44 may rotate.

Figure 10:
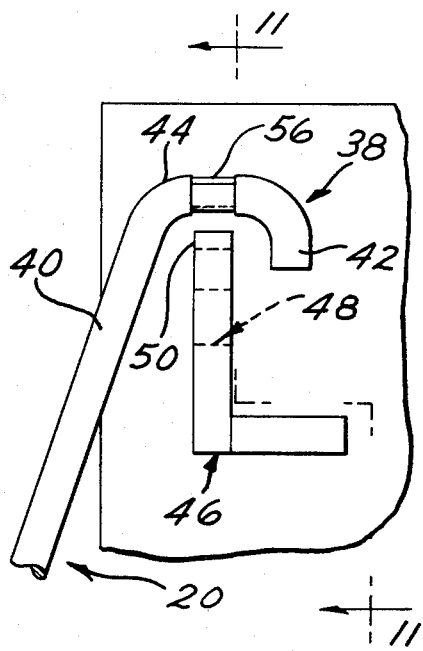
FIG. 10 is an alternate embodiment of the end of the rigid wire element shown in FIG. 9.
Figure 11:
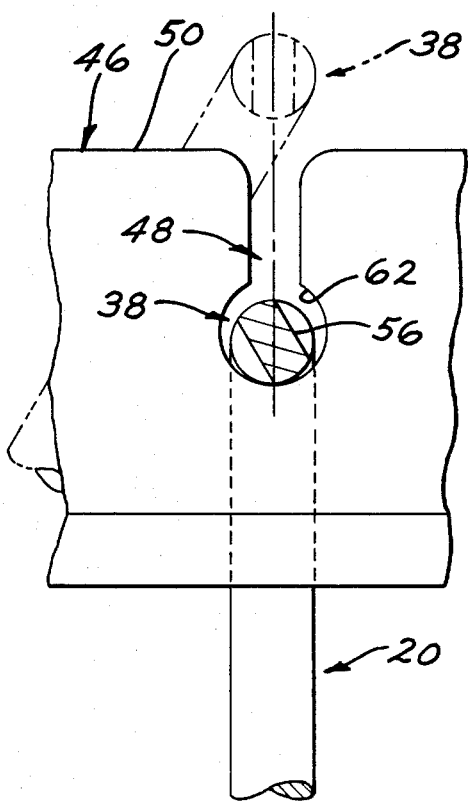
FIG. 11 taken along lines 11—11 of FIG. 10 shows the alternate embodiment of FIG. 9 ready for assembly in phantom and in full line in its assembled position.

An alternate embodiment for attaching the opposite end 38 of the feeler arm 20 to the pivot element 46 is shown in FIGS. 10 and 11. This arrangement is particularly useful when the body 50 of pivot element 46 is made of rigid material such as metal. In the alternate embodiment the central section 44 of the U-shaped terminal end has a reduced portion 56 which fits into a keyhole shaped aperture 48 having an open slot 60 and a circular bottom portion 62. The open slot 60 has a dimension smaller than the outside dimension of the central section 44 and the circular portion 62 has a diameter slightly greater than the outside dimension of the central section 44. The reduced portion 56 of the central section 44 is rectangular shaped as viewed in lateral cross section (FIG. 11) such that when the reduced portion 56 is oriented relative to the open slot 60 as shown in phantom in FIG. 11 it may pass through the slot opening 60 and down into the circular bottom portion 62. Then upon rotation of the feeler arm it assumes the position shown in full line in FIG. 11 and it will be readily understood that in that position the feeler arm 20 cannot be raised back through the slot opening 60 because of the dimensions of the reduced portion 56.

By the above described method of assembling a rigid wire for driven rotational movement there is accomplished completing the icemaker assembly by attaching the feeler arm 20 as the last component, the feeler arm 20 is attached without the need of any supplemental fastener such as a set screw, and a secure assembly is quite easy to accomplish.

While, in accordance with the patent statutes, there has been described what at present is considered to be the preferred method of assembly of the invention, it will be obvious to those skilled in the art that various changes and modifications may be made thereto without departing from the invention. It is, therefore, intended by the appended claims to cover all such changes and modifications as fall within the true spirit and scope of the invention.

What is claimed is:

1. A method of assembling a rigid wire element of generally circular cross section for driven rotational movement comprising:

attaching a rotational element to a drive means, said element having a transverse bore therethrough slightly larger in diameter than the wire diameter;

locating a pivot element spaced from the rotational element, said pivot element having an open slotted aperture with a bottom portion slightly larger in diameter than the wire diameter;

forming a rigid wire element having at one end thereof a relatively straight portion having at one end an integrally formed stop element and at the opposite end a terminal end portion formed at an acute angle relative to the straight portion and the opposite end of the rigid wire element formed as a U-shaped portion having two legs interconnected by a center section with a reduced diameter having two flat opposed sides joined by two arc-shaped opposed sides with the two flat opposite sides having a slightly less dimension than the slot opening of the slotted aperture, allowing passage of the reduced diameter of the center section through the slot opening and the arc-shaped opposed sides having a dimension slightly greater than the slot opening of the slotted aperture so that upon rotating the reduced diameter section out of alignment with the slot opening the arc-shaped sides prevent the center portion from withdrawal from the slotted aperture through the slot opening;

assembling said three elements by;

inserting the terminal end portion of said one end of the rigid wire element through the rotational element tranverse bore;

then rotating the rigid wire element to orient the substantially straight portion parallel to the bore in the rotational element said integrally formed stop element and terminal end portion cooperating to prevent withdrawal of the straight portion from the bore; and then inserting the center section of the U-shaped portion of the rigid wire element into the slotted aperture of the pivot element.

2. The method of claim 1 wherein the integrally formed stop element is a portion of the rigid wire element formed at substantially a right angle to the straight portion.

3. The method of claim 1 wherein the integrally formed stop element is a portion of the rigid wire element that is deformed to give it a dimension greater than the transverse bore of the rotational element.

4. The method of claim 1 wherein the terminal end portion of the rigid wire element is formed at an angle of between 20 and 60 degrees relative to the adjacent straight portion.

5. The method of claim 1 wherein the rotational element and the pivot element are in axial alignment.

* * * * *